United States Patent
Torr

(10) Patent No.: US 8,849,868 B2
(45) Date of Patent: *Sep. 30, 2014

(54) ABSTRACTION LAYER FOR ONLINE/OFFLINE RESOURCE ACCESS

(71) Applicant: Microsoft Corporation, Redmond, WA (US)

(72) Inventor: Peter Torr, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/769,760

(22) Filed: Feb. 18, 2013

(65) Prior Publication Data

US 2013/0159399 A1    Jun. 20, 2013

Related U.S. Application Data

(63) Continuation of application No. 13/079,360, filed on Apr. 4, 2011, now Pat. No. 8,380,751, which is a continuation of application No. 12/147,475, filed on Jun. 26, 2008, now Pat. No. 7,941,458.

(51) Int. Cl.
*G06F 7/00* (2006.01)
*G06F 17/30* (2006.01)
*H04L 29/06* (2006.01)

(52) U.S. Cl.
CPC ............ *H04L 67/42* (2013.01); *G06F 17/3002* (2013.01); *G06F 17/30056* (2013.01); *G06F 17/30029* (2013.01)
USPC ........................................................ 707/802

(58) Field of Classification Search
None
See application file for complete search history.

(56) References Cited

U.S. PATENT DOCUMENTS

| | | | |
|---|---|---|---|
| 7,426,734 B2 | 9/2008 | Debique et al. |
| 2004/0001106 A1 | 1/2004 | Deutscher et al. |
| 2004/0107245 A1 | 6/2004 | Bodnar |
| 2005/0114800 A1 | 5/2005 | Rao |
| 2005/0268243 A1 | 12/2005 | Moser |
| 2006/0165383 A1 | 7/2006 | Park et al. |
| 2007/0047280 A1 | 3/2007 | Haustein et al. |
| 2007/0156845 A1 | 7/2007 | Devanneaux et al. |
| 2007/0256115 A1 | 11/2007 | Lee |

(Continued)

FOREIGN PATENT DOCUMENTS

WO    2008007482    1/2008

OTHER PUBLICATIONS

Author Unknown, "High Definition Advanced Content", retrieved on Apr. 28, 2008, 2 pages. http://videoduplicators.com/hd-advanced-content-authoring.html.

(Continued)

*Primary Examiner* — Uyen Le
(74) *Attorney, Agent, or Firm* — Micah Goldsmith; Judy Yee; Micky Minhas

(57) ABSTRACT

A resource abstraction layer for use in a media processing environment includes a configuration file and a set of computer-executable instructions. Both network-based and locally-accessible resources are indirectly accessible via the resource abstraction layer. The configuration file has at least two data structures—a first data structure storing "virtual resource identifiers," which reference particular resource usable in connection with rendering a particular media presentation, and a second data structure storing "virtual location identifiers," which reference one or more locations at which particular resources are stored. The set of computer-executable instructions facilitates use of the configuration file, and seamless indirect access by the media processing environment to particular resources, regardless of where such resources are located. Temporary resources may be rendered while a particular resource is being accessed via the resource abstraction layer.

20 Claims, 4 Drawing Sheets

(56) References Cited

U.S. PATENT DOCUMENTS

2007/0297764 A1     12/2007    Shibutani
2008/0002950 A1      1/2008    Ando et al.

OTHER PUBLICATIONS

Christopher Diggins, "Introduction to HD DVD Authoring", Apr. 2006, 4 pages.

Nicole Lawler, "HD DVD Delivers Advanced Content and Interactivity by Offering Exclusive Web-Enabled Capabilities", Jun. 28, 2007, 2 pages.

Unknown Author, "Microsoft Technology Brings HD DVD to the Mainstream", Jan. 8, 2007, 1 page.

Unknown Author, "Advanced Access Content System (AACS)", Aug. 15, 2006, 166 pages.

Unknown Author, "Requriements Specification for HD DVD Video Application", Jul. 2005, 73 pages.

ABSTRACTION LAYER FOR ONLINE/OFFLINE RESOURCE ACCESS

STATEMENT OF RELATED APPLICATIONS

This application is a continuation of U.S. patent application Ser. No. 13/079,360, filed Apr. 4, 2011, (now U.S. Pat. No. 8,380,751, issued Feb. 19, 2013), which is a continuation of U.S. patent application Ser. No. 12/147,475, filed Jun. 26, 2008 (now U.S. Pat. No. 7,941,458, issued May 10, 2011), which are incorporated by reference herein in their entirety.

BACKGROUND

Systems that access multiple resources during operation often access both local resources and network-based resources. One example of such a system is a media processing unit that renders media presentations for user consumption. Media presentations are generally composed of media content such as video, audio, images, text, and/or graphics. Both client-side and network-side media processing units are used to render media presentations for user consumption. Resources such as computer programs and media content (video clips, audio clips, graphics, images, text, and the like) used in connection with rendering media presentations may be distributed together with or separate from the media presentations. Authors of media presentations often prefer to use network-based resources (sometimes colloquially referred to as "Web-enabled content") to provide current advertising, images, information, gaming, and the like, which is rendered in connection with media presentations authored for separate distribution (for example, via DVD, downloading, or other techniques).

Authors often find it problematic to include Web-enabled content in media presentations, however, because fluctuating access to network connectivity, and thus network-based resources, may cause consumers of the media presentations to experience glitches such as delays, errors, and the like. Moreover, authored content is often not re-usable when new or different resources are specified.

SUMMARY

A resource abstraction layer is provided for use by any type of system that accesses multiple resources during operation. In an exemplary implementation described herein, a media processing environment utilizes the resource abstraction layer in connection with rendering a particular media presentation that accesses a number of resources. The resource abstraction layer features a configuration file and at least one set of computer-executable instructions.

The configuration file has a number of data structures, including at least a first data structure storing items of first data and a second data structure storing items of second data. Optionally, a third data structure stores items of third data. A particular item of first data is referred to as a "virtual resource identifier." A virtual resource identifier represents a resource usable in connection with rendering a particular media presentation. A particular item of second data is referred to as a "virtual location identifier." A virtual location identifier represents a location at which a particular resource (represented by a virtual resource identifier) is stored. A particular resource may be stored in more than one location. A particular item of third data represents a "location selection criterion" associated with a particular resource—for example, an indicator of priority (order, for example) in which particular storage locations are to be accessed/searched when a particular resource is stored in more than one location.

The set of computer-executable instructions is configured to accept one or more arguments (for example, virtual resource identifiers, which are made known to a media processing unit via the configuration file or a separate list), and to consult the configuration file to ascertain a storage location, corresponding to a particular virtual location identifier, of the particular resource referenced by the resource argument. In one exemplary implementation, storage locations are identified/accessed in priority order, based on one or more location selection criteria set forth in items of third data or elsewhere. The set of computer-executable instructions may return the resource itself, or a location of the resource (or an indication that the resource is inaccessible), for use by the media processing unit in connection with rendering the media presentation.

Temporary resources, referred to as "placeholder" resources, may be rendered while a particular resource is being accessed via the resource abstraction layer, and/or in the event a particular resource is inaccessible. In this manner, resources are indirectly accessed via their virtual location identifiers, and vitalized to enable seamless online and offline access.

Resources may optionally be copied (before or after use by the media processing unit) to predetermined locations in persistent or temporary local or remote computer-readable media. The same or a different set of computer-executable instructions may manage the storage/status of resources that have been previously accessed/copied, so that unnecessary operations may be avoided.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

DETAILED DESCRIPTION

A resource abstraction layer is provided for use in a media processing environment, to vitalize both network-based and locally-accessible resources usable in connection with rendering a particular media presentation. The resource abstraction layer features a configuration file and at least one set of computer-executable instructions. The configuration file and the computer-executable instructions may be located in any desirable network-based or locally-accessible portable or non-portable computer-readable medium. Media presentations authored to utilize the resource abstraction layer may be sufficiently generalized so as to be re-usable, and glitches affecting consumer experiences can be minimized. In addition, any system that accesses multiple resources during operation may benefit from the resource abstraction layer described herein.

Figure 1:
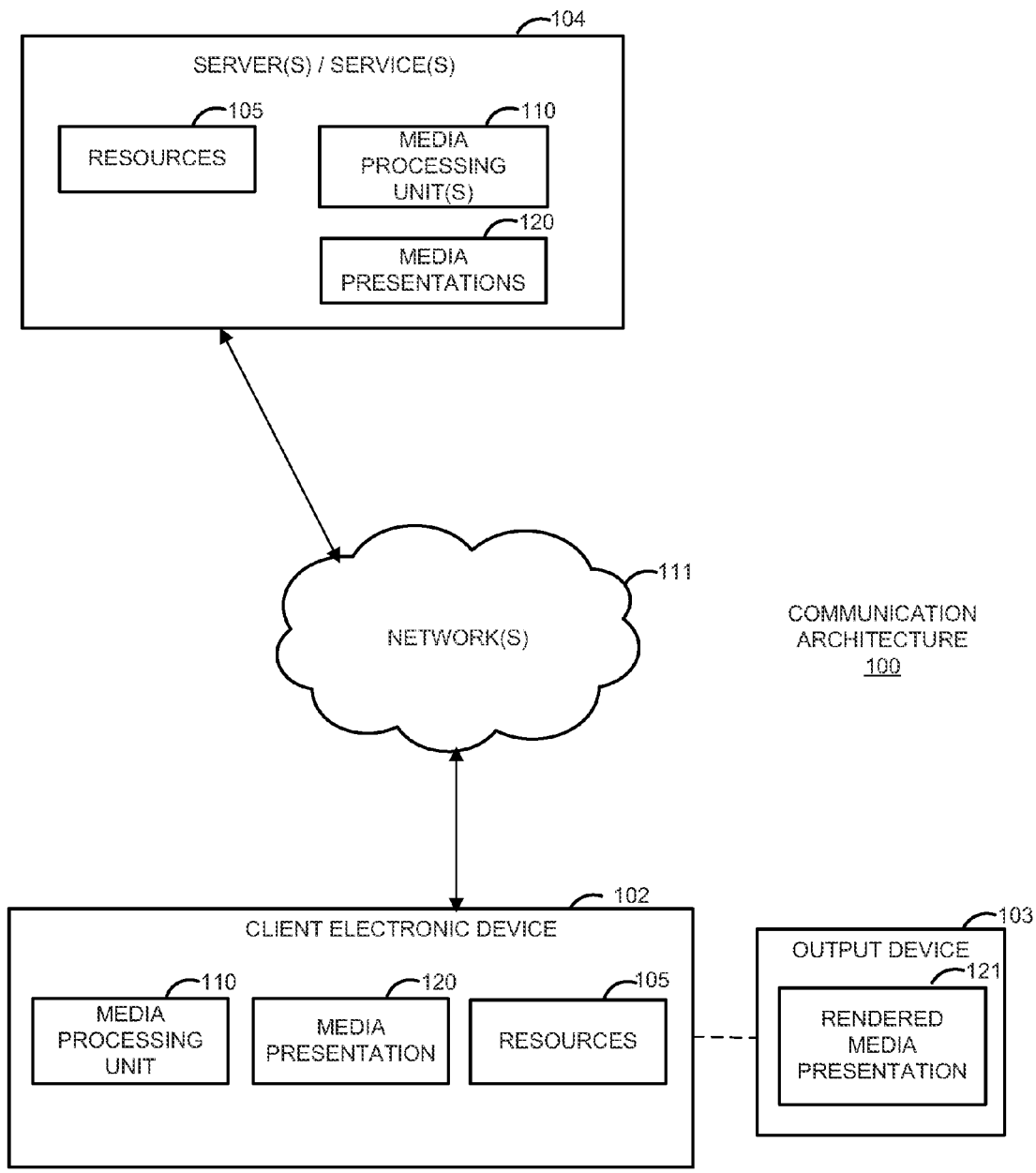
FIG. 1 is a simplified block diagram of an exemplary communication architecture via which media presentations and associated resources are distributed and/or rendered.

Turning now to the drawings, where like numerals designate like components, FIG. 1 is a simplified block diagram of a communication architecture 100 via which media presentations 120 and associated resources 105 are distributed to and/or rendered by network-based and/or client-based media processing units 110.

Media presentation(s) 120 are composed of any commercial or non-commercial media content such as video, audio, images, text, and/or graphics. It will be understood that a particular media presentation or a portion thereof may be, or may include, portions of what would be considered to be a larger work, may exist in any known or later developed format or combination of formats, and may be protected by one or more enforceable intellectual property rights of one or more entities, such as copyrights, patent rights, trademark rights, or trade secret rights. Media presentations 120 may originate from, be distributed by, stored by, or rendered by any known or later developed entity or device (server/services 104 and client electronic device 102 are shown), subject to any applicable and enforceable intellectual property rights.

Resources 105 include but are not limited to items of media content, objects, interfaces, computer programs, or other elements accessed in connection with rendering a particular media presentation 120 by a particular media processing unit 110. Some resources 105 are locally-accessible by a rendering media processing unit (for example, resources cached in connection with a media presentation and/or hosted by a client-side or network-side device associated with the rendering media processing unit), and some resources 105 are accessible via one or more networks, such as one or more networks 111 (discussed further below).

Media processing units 110 represent any client- or server-based electronic devices (or any physical or logical element of such electronic devices, either standing alone or included in other devices), which facilitate rendering of media presentations 120. It will be understood that media processing units are not necessarily devices, nor necessarily limited to media playback functions, but can be, or can be used by, any kind of software. Examples of media processing units 110 include but are not limited to media player devices, media player software, Web browsers, and the like. Media processing units 110 may be in the form of hardware, software, firmware, or any combination thereof, and generally include components such as transceivers, multiplexers/demultiplexers, encoders/decoders ("codecs"), encrypters/decrypters, and the like. It will be appreciated that any known or later developed framework may be used to implement media processing units 110. As shown, a network-side media processing unit is associated with servers/services 104, and a client-side media processing unit 110 is associated with client electronic device 102.

Client electronic device 102 is any electronic device (or any physical or logical element of such an electronic device, either standing alone or included in other devices), which is operated by a user (not shown) or automated, and is configured for communication via any network(s) 111. Client electronic device 102 itself may integrated with client-side media processing unit 110 to store and/or render MP 120, or alternatively client electronic device 102 and media processing unit 110 may be separate devices. Examples of client electronic devices include but are not limited to PCs, mobile phones, personal digital assistants, personal media players, computer/television devices, set-top boxes, hard-drive storage devices, video cameras, DVD players, gaming consoles, local media gateways, and devices temporarily or permanently mounted in transportation equipment such as wheeled vehicles, planes, or trains. As shown, client electronic device has an associated output device 103, which is used to present rendered media presentation 121 to a user. Exemplary output devices 103 in the context of media devices include but are not limited to displays, speakers, printers, and the like, although in other systems different output devices are possible Networks 111 represent any existing or future, public or private, wired or wireless, wide-area or local-area, packet-switched or circuit-switched, one-way or two-way digital data transmission infrastructures or technologies configured to support any known or later developed media distribution protocols or techniques. Exemplary networks 111 include: the Internet; managed wide-area networks (for example, cellular networks, satellite networks, fiber-optic networks, co-axial cable networks, hybrid networks, copper wire networks, and over-the-air broadcasting or data casting networks); wireless local area networks; and personal area networks. Different types of networks 111 have different, often interdependent characteristics, such as speed, availability, bandwidth, usage level, and usage cost.

Figure 2:
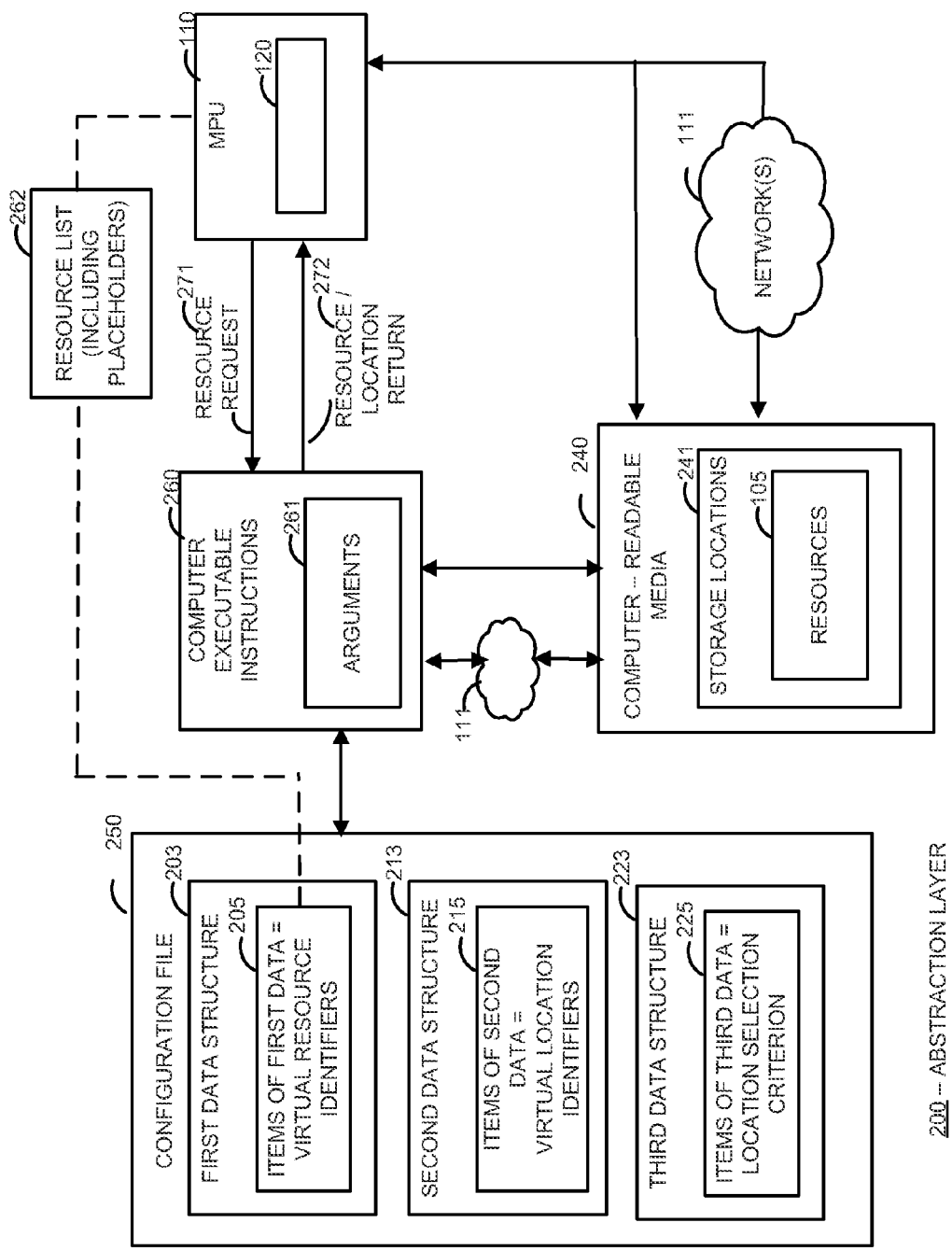
FIG. 2 is a simplified functional block diagram illustrating certain aspects of an abstraction layer usable by the client-side and/or network-side media processing units shown in FIG. 1 to render media presentations and associated resources.

With continuing reference to FIG. 1, FIG. 2 is a simplified functional block diagram of certain aspects of an abstraction layer 200 usable by client-side and/or network-side media processing units 110 to render media presentations 120, in connection with which various resources 105, stored at various storage locations 241 within one or more computer-readable media 240 (locally-accessible and/or network-based) are accessed. Abstraction layer 200 includes a configuration file 250 and a set of computer-executable instructions 260. A resource list 262 is also shown, although at least some of the information within resource list 262 (discussed further below) may be considered to be part of configuration file 250.

Configuration file 250 is generally authored using any desirable data constructs or programming language. In one exemplary implementation, data structures 203, 213, and 223 (discussed further below) are declarative language data structures conforming to a particular extensible markup language ("XML") schema. One configuration file 250 is generally associated with a particular media presentation 120, and may be, but is not necessarily, authored by the same entity. In one exemplary implementation, configuration file 250 is distributed with the particular media presentation with which it is associated—for example, on-disc with the media presentation. It will be appreciated, however, that such co-distribution is not necessary, and that configuration file 250 may be located in any network-based, client-side, or stand-alone computer-readable medium, and distributed in any desired manner.

As shown, configuration file 250 has a number of data structures, including at least a first data structure 203 storing items of first data 205 and a second data structure 213 storing items of second data 215. An optional third data structure 223 stores items of third data 225. Additional data structures are possible (not shown). One example of an additional data structure is a data structure for storing a storage indicator, which gives guidance as to whether accessed resources 205 should be cached (or otherwise stored locally) or not.

A particular item of first data 205 is referred to as a "virtual resource identifier." A virtual resource identifier represents a particular resource 105 usable in connection with rendering a particular media presentation. A virtual resource identifier may refer to one or more actual file names. More specifically, in one exemplary implementation, each virtual resource identifier may be associated with one or more file names, and the appropriate file name can be chosen at run-time based on criteria such as environmental conditions (for example, the current language settings, the physical location of the media processing unit). In this manner, an application can easily be localized via the use of virtual resource identifiers, and by having the appropriate mappings from virtual names to language-specific file names. One possible nomenclature for such file names includes the use of human language identifiers in conjunction with virtual resource identifiers. Examples of human language identifiers are "en" for English, "es" for Spanish, "de" for German, "ja" for Japanese, and so on. It will be appreciated that naming conventions used herein are for illustrative purposes only, and that any desired naming conventions may be used, using any desired characters, strings, numbers, or other direct or indirect references. In one exemplary implementation, resource list 262 provides a list of virtual resource identifiers for the particular resources 105 usable in connection with rendering a particular media presentation 120. As discussed above, resource list 262 may be part of configuration file 250 or separate from configuration file 250, and distributed with or separate from configuration file 250. Resource list 262 may also include placeholder resources, which are temporary resources (such as graphics or images) renderable by a particular media processing unit while actual resources are being located and/or are deemed to be inaccessible.

A particular item of second data 215 is referred to as a "virtual location identifier." A virtual location identifier represents a locally-accessible or network-accessible location at which a particular resource may be stored on a computer-readable medium. A particular resource may be stored in more than one location. When a particular resource is stored in more than one location, the virtual resource identifier for that resource will have multiple associated virtual location identifiers. In one exemplary implementation, a virtual location identifier is a path, a vector, a pointer, or a uniform resource locator ("URL") referencing a particular storage location.

A particular item of third data 225 represents a "location selection criterion" associated with a particular resource—for example, an indicator of the priority, or order, in which a particular storage location is to be accessed/searched when the particular resource is stored in more than one location. In one example, an item of third data may be a reference to a priority algorithm stored at a predetermined location. In another example, an item of third data may be a number or other order/priority indicator, which when examined in context of other virtual location identifiers associated with a particular virtual resource identifier, provides guidance as to the order, or priority, in which attempts to access storage locations for a particular resource should be made (known storage locations may be searched in priority order, for example).

The set of computer-executable instructions 260, which in one exemplary implementation is an on-disc ECMA Script library, but which may exist in any desired location or programming language, is configured to accept resource requests 271 from media processing unit 110, and to return to media processing unit 110 (via resource/location return 272), the requested resources, locations of the requested resources, or indications that the requested resources were not found. Temporary resources, referred to as "placeholder" resources (shown in connection with resource list 262), may be rendered while a particular resource is being located, and/or in the event a particular resource is inaccessible.

As shown, computer-executable instructions 260 accept one or more arguments 261. In one exemplary implementation, arguments 261 correspond to one or more virtual resource identifiers and/or human-language identifiers associated with particular resource(s), which is/are made known to a media processing unit via list of resources 262 (as discussed above, placeholder resources may also be stored along with the virtual resource identifiers, to facilitate their rendering while a particular resource is being located and/or in the event a particular resource turns out to be inaccessible). Based on arguments 261, configuration file 250 is consulted to ascertain a storage location (corresponding to a particular virtual location identifier) of the particular resource corresponding to a particular argument. Computer-executable instructions 260 may search all or some of the storage locations specified by virtual location identifiers associated with a particular virtual resource identifier—as discussed above, location selection criterion or criteria may be specified by third data structure 223/items of third data 225 or in another manner, and may provide parameters for accessing/searching for resources 105. This is also the point at which it is decided which file name to use given the virtual identifier—for example, if the argument requests the file "OK_BUTTON," and if the current language is English, that may map to "OK_BUTTON_EN.PNG" (or another format), but if the current language is Japanese, that may map to "OK_BUTTON_JA.PNG."

If a particular resource 105 is accessed (generally, copied) from a network-based storage location, the resource may be cached or otherwise stored locally at a predetermined location for future use. Computer-executable instructions 260 or a separate set of computer-executable instructions (not shown) may manage the storage/status of resources that have been previously accessed, so that unnecessary processing operations can be avoided. As network-based resources are accessed and stored, configuration file 250 may be updated with additional items of second data 215.

Figure 3:
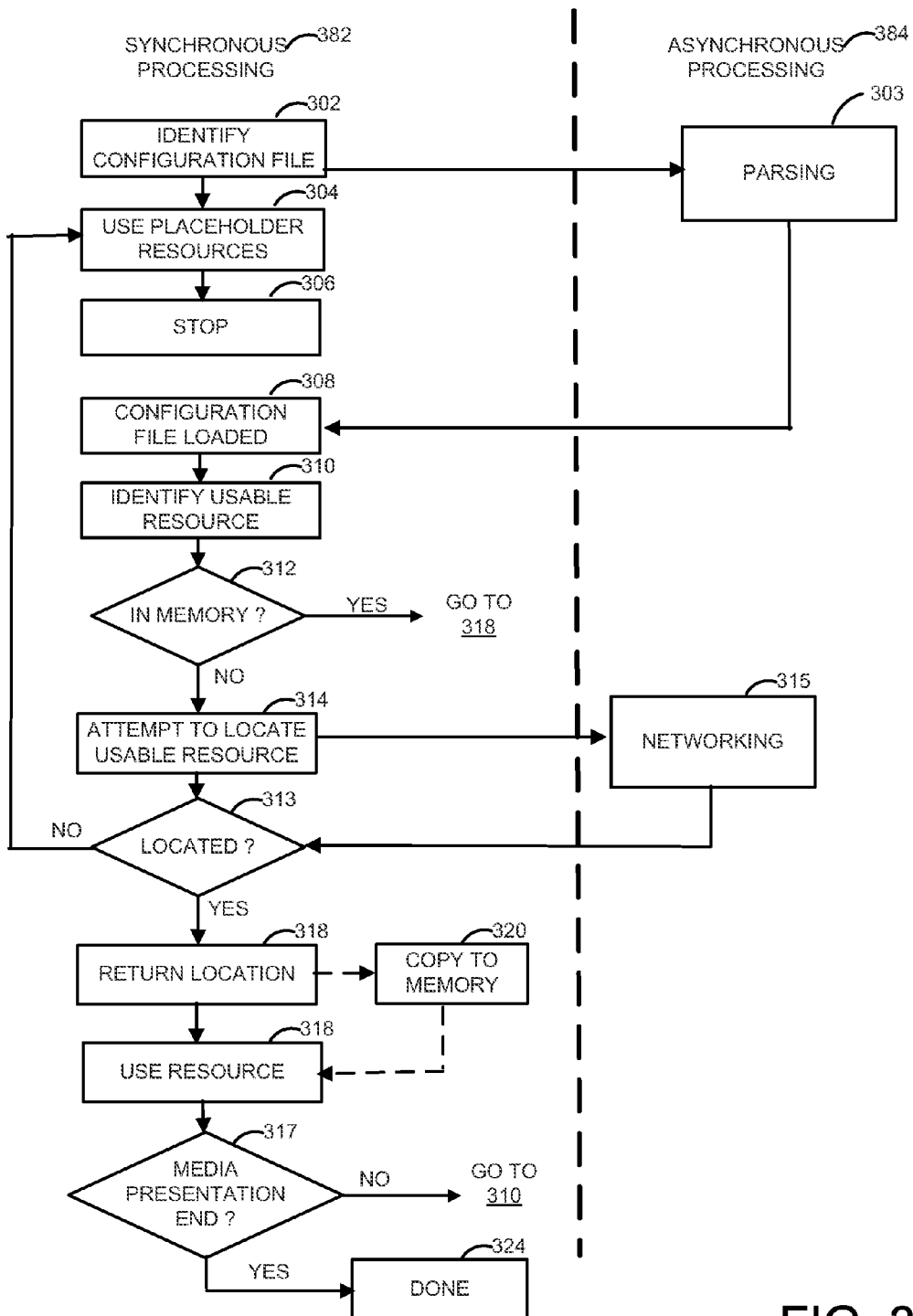
FIG. 3 is a flowchart illustrating certain aspects of a method for rendering a media presentation using aspects of the abstraction layer illustrated in FIG. 2.

With continuing reference to FIGS. 1 and 2, FIG. 3 is a flowchart illustrating certain aspects of a method for rendering a media presentation, such as media presentation 120, using a media processing unit, such as a client-side or network-side media processing unit 110. In the exemplary scenario discussed herein, it is assumed that a particular configuration file 250 and a particular resource list 262 (including placeholder resources) corresponding to media presentation 120 exist and are locally accessible by the media processing unit, and that a particular set of computer-executable instructions 260 is executing at the startup of media presentation 120.

Figure 4:
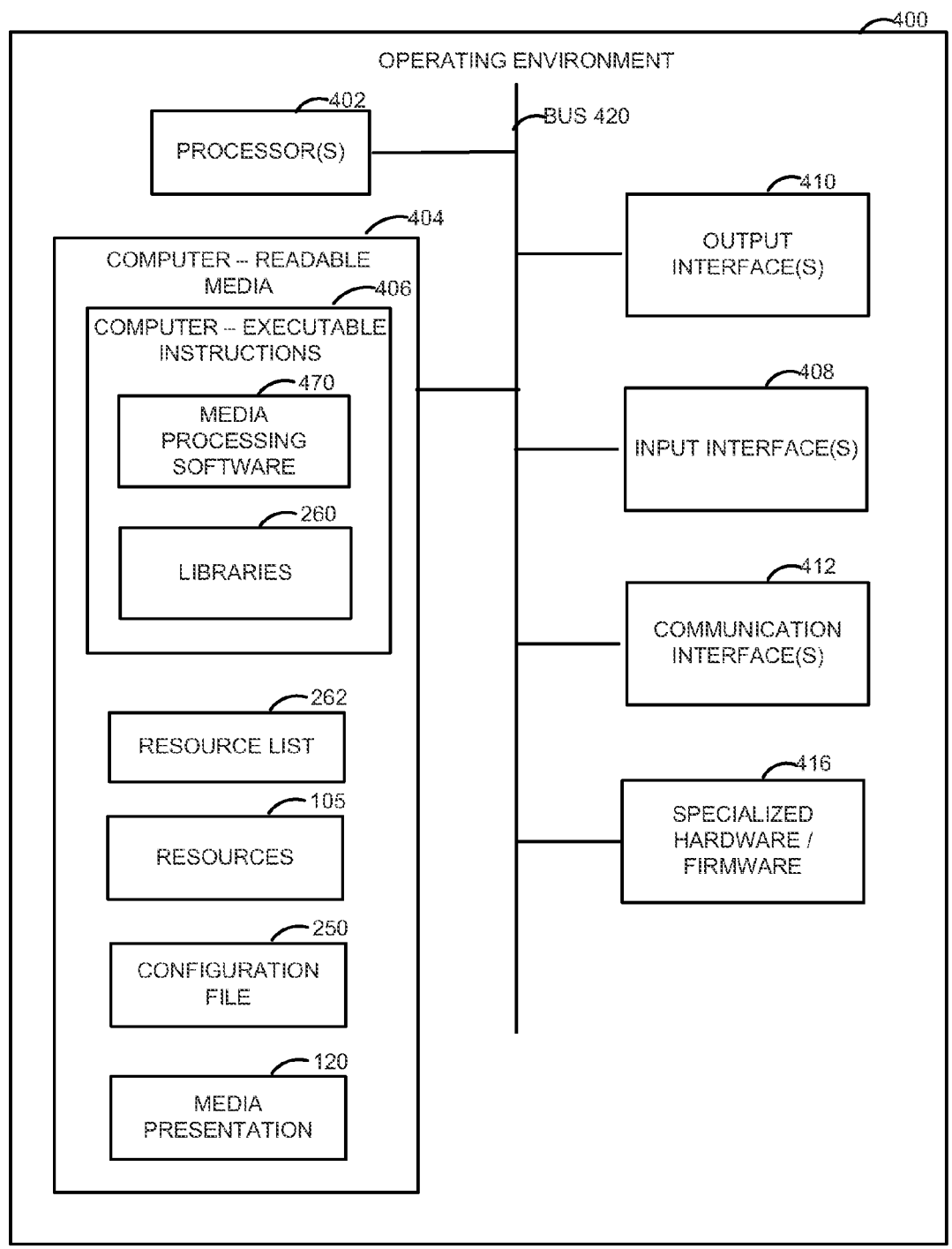
FIG. 4 is a simplified block diagram of an exemplary operating environment in which aspects of the media processing unit(s), the abstraction layer illustrated in FIG. 2 and/or the methods illustrated in FIG. 3 may be implemented or used.

The method shown in FIG. 3 may be implemented in one or more general, multi-purpose, or single-purpose processors, such as processor 402 discussed further below in connection with FIG. 4. Unless specifically stated, the method is not constrained to a particular order or sequence. In addition, some of the described steps or elements thereof can occur or be performed concurrently. In the exemplary implementation, steps involving generally synchronous processing 382 are shown on the left side of the flowchart; while steps involving asynchronous processing 384 are shown on the right side of the flowchart. It will be appreciated, however, that the synchronous/asynchronous distinction is made for illustrative purposes, and not for purposes of limitation. In an alternative implementation, for example, the method steps may be performed synchronously.

Referring to FIG. 3, the method begins at block 302, where a configuration file, such as configuration file 250, is identified. The configuration file is parsed, as indicated at block 303. In one exemplary scenario, computer-executable instructions 260 (referred to for discussion purposes as "the library") read and parse configuration file 250 at startup of media presentation 120. As indicated at blocks 304 and 306, placeholder resources are rendered, if necessary, while a configuration file 250 is being parsed or otherwise located, and/or in the event a particular resource is inaccessible.

Once configuration file 250 is loaded (as indicated at block 308), from time-to-time the media processing unit identifies resources 105 usable in connection with rendering media presentation 120, as indicated at block 310. Such identification may occur by any known or later developed mechanism, such as via a playlist or another mechanism. It is generally assumed that resource identification includes the identification of the virtual resource identifier stored in configuration file 250, although it will be appreciated the resource identification and ascertaining the virtual resource identifier associated with the resource may be separate steps and/or methods.

Upon identification of a particular resource 105, the resource 105, and/or the storage location 241 thereof, is requested (using resource request 271, for example) via computer-executable instructions 260. In one exemplary implementation, set of computer-executable instructions 260 is called via resource request 271, with an argument 261 corresponding to the virtual resource identifier of the particular requested resource 105. For discussion purposes, it is assumed that resources 105 are identified and requested individually, although it will be appreciated that a number of resources 105 may be identified and/or requested concurrently. A placeholder resource may be rendered while waiting for resource/location return 272 from computer-executable instructions 260.

It is optionally to be determined at diamond 312 if the resource 105 identified at block 310 is already loaded into a locally-accessible, temporary or persistent computer-readable medium. If so, there would generally not be a need to attempt to locate the resource at block 314 from a different storage location via the use of asynchronous networking techniques 315, and the method would continues at block 318, where the location of the resource (and/or the resource 105 itself) is returned.

If either the determination at diamond 312 is not made, or it is determined at diamond 312 that the identified resource is not already loaded into a locally-accessible memory, then an attempt to locate the resource is made using asynchronous networking techniques, as indicated at blocks 314 and 315. In one exemplary implementation, the library consults configuration file 250 (or an in-memory representation thereof) to ascertain one or more storage locations, corresponding to virtual location identifiers, of the particular resource referenced by the argument. In one exemplary scenario, the library starts an asynchronous process to locate the resource from the "best" possible location (the term best designating a subjective determination, based on factors such as network access cost, network availability, bandwidth, processing time, and the like). The asynchronous location process may be specified in whole or in part via one or more location selection criterion set forth in items of third data or elsewhere.

When at diamond 313 it is determined that the resource has been located, the resource itself and/or a location of the resource may be returned (via resource location/return 272, for example) to the media processing unit, which uses the resource in connection with rendering the media presentation, as indicated at block 318. If the resource is inaccessible, then placeholder resources may be (or may be continued to be) rendered by the media processing unit. In an exemplary scenario, it is attempted to access the resource from all possible locations (not just the "best" one) before giving up and returning "resource not found." Such attempts may be made in series (that is, try one location, fail; try another location, fail; and so on); or may be made contemporaneously, returning the first result to come back.

As indicated at block 320, the resource may optionally be copied to a locally-accessible computer-readable medium (cached, for example). The same or a different library may manage the storage/status of resources that have been so copied, so that unnecessary processing operations may be avoided if the resources are used again in connection with rendering the media presentation.

The media processing unit continues to identify and locate usable resources as described above, until at diamond 317 it is determined that the media presentation is ended.

In this manner, content authors can achieve generalized and often re-usable code, fluctuations in resource availability can be accommodated, and users can enjoy relatively glitch-free and predictable media consumption experiences using a wide variety of media processing units. The resource abstraction layer described herein may also be implemented in connection with other types of systems that access multiple resources in a variety of local and/or network-based locations.

With continuing reference to FIGS. 1 through 3, FIG. 4 is a simplified block diagram of an exemplary operating environment 400 in which aspects of the abstraction layer shown in FIG. 2 and/or the method(s) shown in FIG. 3 may be implemented or used. Operating environment 400 is generally indicative of a wide variety of general-purpose or special-purpose computing environments, and is not intended to suggest any limitation as to the scope of use or functionality of the system(s) and methods described herein. For example, operating environment 400 may be a client electronic device such as a mobile phone, a personal digital assistant, a personal computer, a personal media player, a computer/television device, a set-top box, a hard-drive storage device, a video camera, a DVD player, a cable modem, a local media gateway, a device temporarily or permanently mounted in transportation equipment such as a wheeled vehicle, a plane, or a train, or another type of known or later developed consumer electronic device. Operating environment 400 may also be a type of networked server, or any aspect thereof. Such a server may be part of a distributed computing network, and may be used to implement, host, or proxy any type of network-based service in whole or in part.

As shown, operating environment 400 includes processor 402, computer-readable media 404, and computer-executable instructions 406. One or more internal buses 420 may be used to carry data, addresses, control signals, and other information within, to, or from operating environment 400 or elements thereof.

Processor 402, which may be a real or a virtual processor, controls functions of the operating environment by executing computer-executable instructions 406. The processor may execute instructions at the assembly, compiled, or machine-level to perform a particular process.

Computer-readable media 404 may represent any number and combination of local or remote devices, in any form, now known or later developed, capable of recording, storing, or transmitting computer-readable data, such as the above-noted computer-executable instructions 406 (media processing software 470 and libraries 260 are shown), media presentation 120, resources 105, resource list 280, and/or configuration file 250. In particular, computer-readable media 404 may be, or may include, a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; a paper tape; a punch card; or any combination thereof. The computer-readable media may also include transmission media and data associated therewith. Examples of transmission media/data include, but are not limited to, data embodied in any form of wireline or wireless transmission, such as packetized or non-packetized data carried by a modulated carrier signal.

Computer-executable instructions 406 represent any signal processing methods or stored instructions. Generally, computer-executable instructions 406 are implemented as software components according to well-known practices for component-based software development, and encoded in computer-readable media. Computer programs may be combined or distributed in various ways. Computer-executable instructions 406, however, are not limited to implementation by any specific embodiments of computer programs, and in other instances may be implemented by, or executed in, hardware, software, firmware, or any combination thereof.

Input interface(s) 408 are any now known or later developed physical or logical elements that facilitate receipt of input to operating environment 400.

Output interface(s) 410 are any now known or later developed physical or logical elements that facilitate provisioning of output from operating environment 400.

Communication interface(s) 412 represent one or more physical or logical elements, such as connectivity devices or computer-executable instructions, which enable communication between operating environment 400 and external networks, devices or services, via one or more protocols or techniques. Such communication may be, but is not necessarily, client-server type communication or peer-to-peer communication. Information received at a given network interface may traverse one or more layers of a communication protocol stack.

Specialized hardware 416 represents any hardware or firmware that implements functions of operating environment 400. Examples of specialized hardware include encoder/decoders decrypters, application-specific integrated circuits, clocks, and the like.

It will be appreciated that particular configurations of operating environment 400 may include fewer, more, or different components or functions than those described. In addition, functional components of operating environment 400 may be implemented by one or more devices, which are co-located or remotely located, in a variety of ways.

Functions/components described herein as being computer programs are not limited to implementation by any specific embodiments of computer programs. Rather, such functions/components are processes that convey or transform data, and may generally be implemented by, or executed in, hardware, software, firmware, or any combination thereof.

It will be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be constructed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

What is claimed is:

1. A method for rendering a media presentation using a client-side media processing unit, comprising:
   accessing a network-side configuration file associated with the media presentation, the network-side configuration file including a virtual resource identifier and a virtual location identifier associated with the media presentation, the virtual resource identifier representing at least one resource usable in connection with rendering the media presentation and the virtual location identifier representing a location at which the at least one resource may be stored;
   identifying a particular resource usable in connection with rendering the media presentation; and
   based on data in the configuration file, obtaining a virtual location identifier for the particular resource so that the particular resource can be used by the client-side media processing unit to render the media presentation.

2. The method of claim 1 in which the virtual resource identifier is associated with at least one file name chosen at run-time.

3. The method of claim 2 in which the virtual resource identifier is chosen at run-time based on a current language setting.

4. The method of claim 2 in which the virtual resource identifier is chosen at run-time based on a physical location of the media processing unit.

5. The method of claim 1 in which the configuration file further includes location selection criteria representing a plurality of locations at which the particular resource is located.

6. The method of claim 5 in which the location selection criteria includes a priority indicator specifying an order in which the plurality of locations are to be accessed.

7. The method of claim 5 further comprising using the location selection criteria to select a virtual location identifier.

8. The method of claim 1 in which the virtual location resource is network-accessible.

9. A media processing unit, comprising:
   a computer-readable storage medium; and
   a processor responsive to the computer-readable storage medium and to a computer program, the computer program, when loaded into the processor, operable to perform a method comprising:
   accessing configuration information over a network, the configuration information being associated with the media presentation and including a virtual resource identifier and a virtual location identifier, the virtual resource identifier representing at least one resource usable in connection with rendering the media presentation and the virtual location identifier representing a location at which the at least one resource may be stored;
   identifying a particular resource usable in connection with rendering the media presentation; and using the configuration information to obtain a virtual location identifier for the particular resource so that the particular resource can be used by the client-side media processing unit to render the media presentation.

10. The media processing unit according to claim 9, in which the virtual resource identifier comprises a symbolic name and one or more file names, and the virtual location identifier is selected from the group comprising a URL, a vector, and a pointer.

11. The media processing unit according to claim 9, in which accessing the configuration information further comprises parsing the configuration information, and wherein placeholder resources are used in connection with rendering the media presentation by the media processing until parsing is completed.

12. The media processing unit according to claim 9, in which using the configuration information comprises:
identifying one or more items of data representing one or more locations at which the particular resource is stored, and in which the method further comprises:
using location selection criteria, selecting a virtual location identifier represented by a particular item of the one or more items of data.

13. The media processing unit according to claim 12, in which the location selection criteria comprises an order in which a particular location represented by a particular item of data is to be accessed when a particular resource is usable in connection with the rendering of the media presentation.

14. The media processing unit according to claim 9, in which identifying a particular resource comprises receiving a request for the particular resource, the request resulting in identification of an actual file name of the particular resource, the actual file name being identified via examination of an environmental condition and the virtual resource identifier.

15. A computer readable storage medium encoded with computer executable instructions which, when executed by a processor, performs a method for rendering a media presentation using a media processing unit, comprising:
accessing a configuration file associated with the media presentation, the configuration file including a virtual resource identifier and a virtual location identifier of a resource and a location, respectively, associated with the media presentation;
identifying a particular resource usable in connection with rendering the media presentation; and
based on data in the configuration file, obtaining a virtual location identifier for the particular resource so that the particular resource can be used by the media processing unit to render the media presentation.

16. The computer readable storage medium of claim 15 in which the virtual resource identifier is associated with at least one file name chosen at run-time.

17. The computer readable storage medium of claim 15 in which the virtual resource identifier is chosen at run-time based on a current language setting.

18. The computer readable storage medium of claim 15 in which the virtual resource identifier is chosen at run-time based on a physical location of the media processing unit.

19. The computer readable storage medium of claim 15 in which the configuration file further includes location selection criteria representing a plurality of locations at which the particular resource is located.

20. The computer readable storage medium of claim 19 in which the location selection criteria includes a priority indicator specifying an order in which the plurality of locations are to be accessed.

* * * * *